J. DUITCH.
DRIVING MECHANISM.
APPLICATION FILED FEB. 9, 1910.
971,364.
Patented Sept. 27, 1910.
2 SHEETS—SHEET 2.
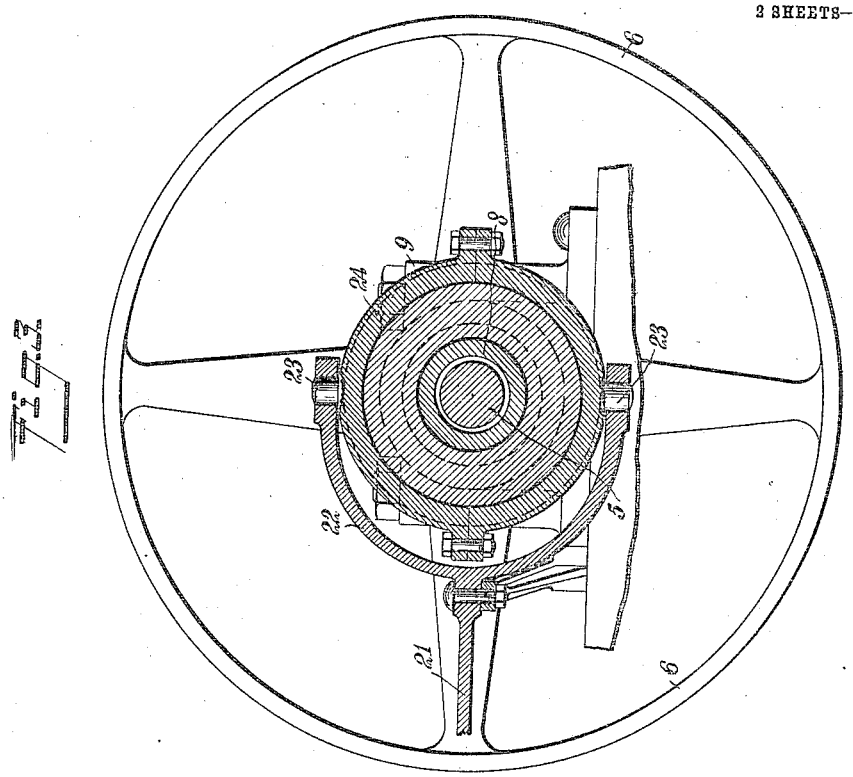
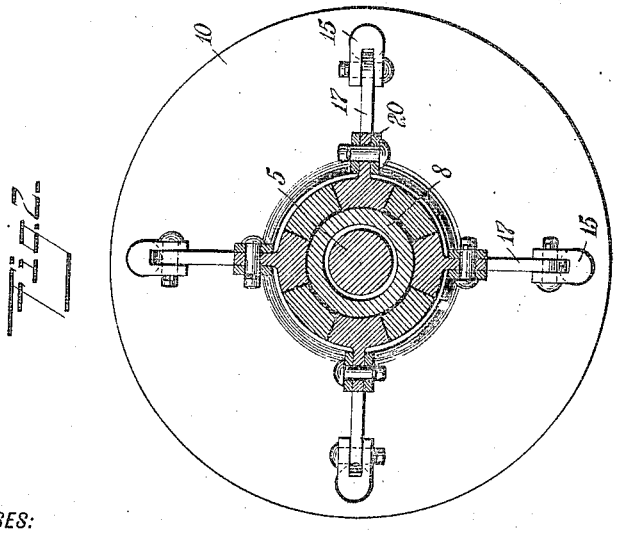
WITNESSES:
INVENTOR
Joseph Duitch
BY
ATTORNEYS

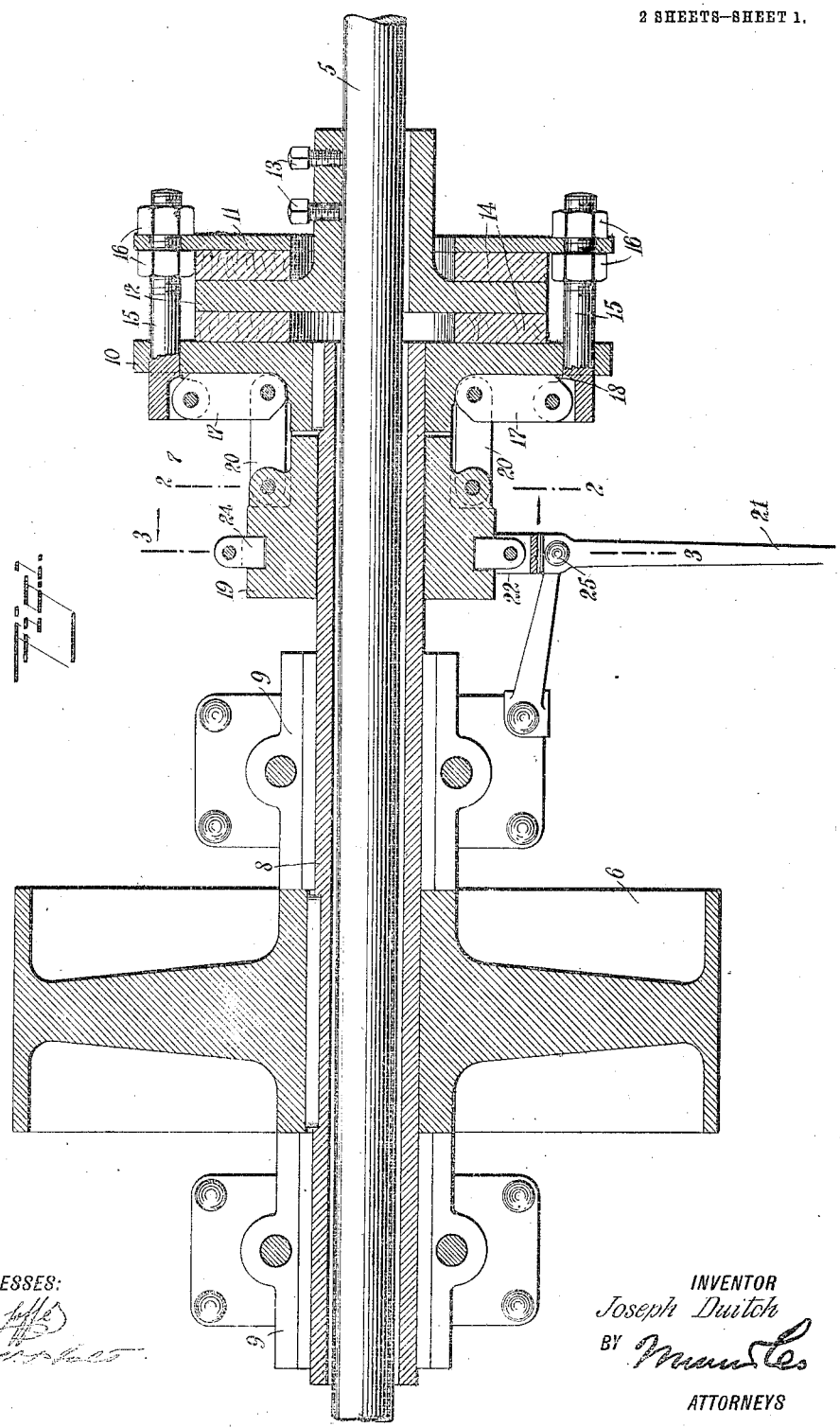

UNITED STATES PATENT OFFICE.

JOSEPH DUITCH, OF FARMINGTON, WEST VIRGINIA.

DRIVING MECHANISM.

971,364.  Specification of Letters Patent.  Patented Sept. 27, 1910.

Application filed February 9, 1910. Serial No. 542,882.

*To all whom it may concern:*

Be it known that I, JOSEPH DUITCH, a citizen of the United States, and a resident of Farmington, in the county of Marion and State of West Virginia, have invented a new and Improved Driving Mechanism, of which the following is a full, clear, and exact description.

The invention is an improvement in driving mechanisms such as embody a shaft, a clutch, and a pulley or other belt or driving wheel, with the clutch associated with the wheel and shaft to connect and disconnect them at will.
The object of the invention is to relieve the shaft of the strain on the wheel incident to the pull on the belt, and also prevent wear between the pulley and shaft so that these parts constantly remain concentric and insure an accurate centering of the clutch members.

Reference is to be had to the accompanying drawings forming a part of this specification, in which similar characters of reference indicate corresponding parts in all the views.

Figure 1 is a central longitudinal section through a driving mechanism embodying my invention; Fig. 2 is a cross-section of the same on the line 2—2 of Fig. 1; and Fig. 3 is a cross-section on the line 3—3 of Fig. 1.

The mechanism essentially embodies a revoluble shaft 5, a pulley or other belt or driving-wheel 6, and a clutch 7, with the clutch arranged and constructed to connect and disconnect the shaft and pulley at will, and the pulley supported independently of the shaft, whereby the latter is relieved of strain, and wearing between these parts avoided so that the clutch members are kept constantly concentric. To this end the pulley is keyed or otherwise fixed to a hollow shaft 8 which is journaled in bearings 9 arranged close to the opposite sides of the pulley, the hollow shaft being accurately centered with the shaft 5 and made substantially larger in internal diameter than the diameter of the shaft 5, so that there will be ample clearance between them.
The hollow shaft 8 is extended some distance beyond one of the bearings 9, where it has keyed or otherwise suitably attached a friction disk 10, forming one side of the clutch 7, the opposite and outer side being formed by a friction disk or member 11 unattached to the shaft 5 and having a sufficient central opening to admit of the hub of an intermediate friction disk or member 12 extending outwardly therethrough, the intermediate friction disk being fixed to the shaft 5 in a suitable way, such as by the set-screw 13 threaded through its hub at the outer side of the friction disk 11. The intermediate friction disk 12 is substantially less in diameter than the outer friction disks 10 and 11, and between the several disks are placed friction disks 14, of wood or other suitable material, the diameter of which is substantially the same as the friction disk 12, and are ordinarily held in place by attaching them to the outer friction disks 10 and 11 respectively. The friction disks 10 and 11 are connected together through their outer portions by bolts 15, the threaded end of each bolt being secured to the friction disk 11 by binding the latter at opposite sides by nuts 16. The heads of the several bolts 15 are bifurcated or slotted at the sides and receive locking levers 17 which are pivoted thereto and have cams 18 at the ends, the cams drawing the outer disks together when the inner edges of the levers are extended along and bear on the face of the friction disk 10. The operation of the levers 17 to apply and release the clutch is controlled by the usual collar 19, slidably splined on the hollow shaft 8 and operatively connected with the cam levers by links 20, the collar being moved back and forth by the shifting lever 21, which has a fork 22 at its inner end engaging the pins or projections 23 extending at diametrically opposite points from the ring 24 revoluble in the annular groove of the collar, as is well known in clutch construction. The shifting lever 21 has a fixed fulcrum 25 intermediate its length so that when the handle of the lever is moved away from the clutch, the members of the clutch will be locked and the pulley and shaft connected, as illustrated in Fig. 1.
When the shifting lever is moved in the opposite direction, the cam levers 17 will be drawn out by the links, allowing the bolts 15 to slacken up on the friction disks, permitting the pulley to remain idle while the shaft 5 revolves, or vice versa, depending on whether the pulley or shaft is the driving member.

Having thus described my invention, I claim as new and desire to secure by Letters Patent:

1. The combination of bearings, a revoluble shaft supported independent of the said bearings a hollow shaft arranged on the first-named shaft and revolubly supported in the said bearings, a belt wheel secured to the hollow shaft between the bearings, and a clutch arranged to connect and disconnect the two shafts, having a shifting lever sleeve slidable on the hollow shaft.

2. The combination of bearings spaced apart, a hollow shaft journaled in the bearings, a driving wheel fixed to the hollow shaft between the bearings, a second shaft arranged within and out of contact with the hollow shaft, and a clutch to operatively connect the two shafts, having a clutch member respectively fixed to each.

In testimony whereof I have signed my name to this specification in the presence of two subscribing witnesses.

JOSEPH DUITCH.

Witnesses:
H. T. HALL,
J. E. SCHNEIDER.